United States Patent [19]
Majeed et al.

[11] Patent Number: 5,559,700
[45] Date of Patent: Sep. 24, 1996

[54] CONTINUOUSLY VARIABLE DAMPING SYSTEM

[75] Inventors: Kamal N. Majeed, Centerville; Scott A. Stacey, Kettering, both of Ohio

[73] Assignee: General Motors Corporation, Detroit, Mich.

[21] Appl. No.: 409,441

[22] Filed: Mar. 27, 1995

[51] Int. Cl.$^6$ .................................................. B60G 17/00
[52] U.S. Cl. .............................. 364/424.15; 364/426.01; 280/707; 280/840
[58] Field of Search ......................... 364/424.05, 424.01, 364/426.01, 426.04, 508, 551.01, 565; 280/707, 688, 840, 6.1, 6.11, 703; 188/378, 381

[56] References Cited

U.S. PATENT DOCUMENTS

| | | | |
|---|---|---|---|
| 2,850,290 | 9/1958 | Borgmann | 280/112 |
| 3,278,197 | 10/1966 | Gerin | 280/124 |
| 3,858,902 | 1/1975 | Howels et al. | 280/124 R |
| 3,941,402 | 3/1976 | Yankowski et al. | 280/124 R |
| 4,468,050 | 8/1984 | Woods et al. | 280/707 |
| 4,468,739 | 8/1984 | Woods et al. | 364/424 |
| 4,544,868 | 10/1985 | Murty | 318/254 |
| 4,579,366 | 4/1986 | Doi et al. | 280/707 |
| 4,606,440 | 8/1986 | Buchanan, Jr. et al. | 188/319 |
| 4,634,142 | 1/1987 | Woods et al. | 280/707 |
| 4,696,489 | 9/1987 | Fujishiro et al. | 280/707 |
| 4,722,548 | 2/1988 | Hamilton et al. | 280/707 |
| 4,770,438 | 9/1988 | Sugasawa et al. | 280/707 |
| 4,815,575 | 3/1989 | Murty | 188/299 |
| 4,826,206 | 5/1989 | Immega | 280/711 |
| 4,844,506 | 7/1989 | Moniguchi et al. | 280/683 |

(List continued on next page.)

FOREIGN PATENT DOCUMENTS

| | | |
|---|---|---|
| 0363153 | 11/1990 | European Pat. Off. . |
| 2594755 | 2/1987 | France . |
| 1111515 | 4/1989 | Japan . |

OTHER PUBLICATIONS

Nonlinear Observers—A State-Of-The-Art Survey, Journal of Dynamic Systems, Measurement & Control, vol. III/351, pp. 344–352, Sep., 1989, U.S.A.
Properties of Min–Max Controllers in Uncertain Dynamical Systems, Siam Journal of Control & Optimization, vol. 20, No. 6, pp. 850–861, Nov., 1982, U.S.A.
Vibration Control Using Semi–Active Force Generators, ASME, Journal of Engineering for Industry, May 1974, pp. 619–626.
An Application of Explicit Self-Tuning Controller to Vehicle Active Suspension Systems, Twenty-Ninth IEEE Conference on Decision in Congrol, Hawaii (Dec. 1990).
Modern Control Engineering, Chapters 14 and 15, K. Ogata, Printice–Hall, Inc., NJ (1970), pp. 663–749.
Active Vibration Isolation of Truck Cabs, K. Majeed, 1984 American Control Conference San Diego, CA (Jun. 6–8, 1984).
Dual Processor Automotive Controller, K. Majeed, Proceedings of the IEEE Application of Automotive Electronics, Dearborn, MI (Oct. 19, 1988), pp. 39–44.

*Primary Examiner*—Kevin J. Teska
*Assistant Examiner*—Tan Nguyen
*Attorney, Agent, or Firm*—Anthony Luke Simon

[57] ABSTRACT

A method of controlling a vehicle suspension system including a real time continuously variable damper comprising the steps of: (a) determining a present actuator command for controlling damping force of the damper; (b) comparing the present actuator command to a previous actuator command to determine a difference value of the actuator commands; (c) if the difference value is positive, limiting the difference value to a positive threshold; (d) if the difference value is negative, limiting the difference value to a negative threshold, wherein the negative threshold has a magnitude greater than a magnitude of the positive threshold; (e) determining an output actuator command responsive to the difference value; and (f) outputting the output actuator command to the damper to control damper force, wherein the limiting of the difference value to the positive threshold reduces suspension harshness and audible noise and wherein the limiting of the difference value to the negative threshold reduces suspension audible noise.

4 Claims, 6 Drawing Sheets

U.S. PATENT DOCUMENTS

| | | | |
|---|---|---|---|
| 4,902,034 | 2/1990 | Maguran et al. | 280/707 |
| 4,907,154 | 3/1990 | Yasuda et al. | 364/424.5 |
| 4,907,680 | 3/1990 | Wolfe et al. | 188/299 |
| 4,909,534 | 3/1990 | Fukushima et al. | 280/707 |
| 4,916,632 | 4/1990 | Doi et al. | 364/424.05 |
| 4,924,392 | 5/1990 | Kurosawa | 364/424.05 |
| 4,937,748 | 6/1990 | Yonekawa et al. | 364/424.05 |
| 4,977,506 | 12/1990 | Hara et al. | 364/424.05 |
| 5,013,062 | 5/1991 | Yonekawa et al. | 280/707 |
| 5,056,812 | 10/1991 | Takehara et al. | 280/707 |
| 5,062,657 | 11/1991 | Majeed | 280/707 |
| 5,062,658 | 11/1991 | Majeed | 280/707 |
| 5,071,157 | 12/1991 | Majeed | 280/707 |
| 5,072,392 | 12/1991 | Tamiguchi | 364/424.05 |
| 5,097,419 | 3/1992 | Lizell | 364/424.05 |
| 5,106,053 | 4/1992 | Miller et al. | 251/129.05 |
| 5,142,476 | 8/1992 | Shibata et al. | 364/424.05 |
| 5,142,477 | 8/1992 | Tsutsumi et al. | 364/424.05 |
| 5,144,559 | 9/1992 | Kaminmura et al. | 364/424.05 |
| 5,276,621 | 4/1994 | Henry et al. | 364/424.05 |
| 5,282,645 | 2/1994 | Spakowski et al. | 280/707 |
| 5,305,860 | 4/1994 | Rotharmel et al. | 188/299 |
| 5,365,432 | 11/1994 | Kakizaki et al. | 364/424.05 |
| 5,401,052 | 3/1995 | Yoshioka et al. | 280/707 |
| 5,434,782 | 7/1995 | Henry | 364/424.05 |

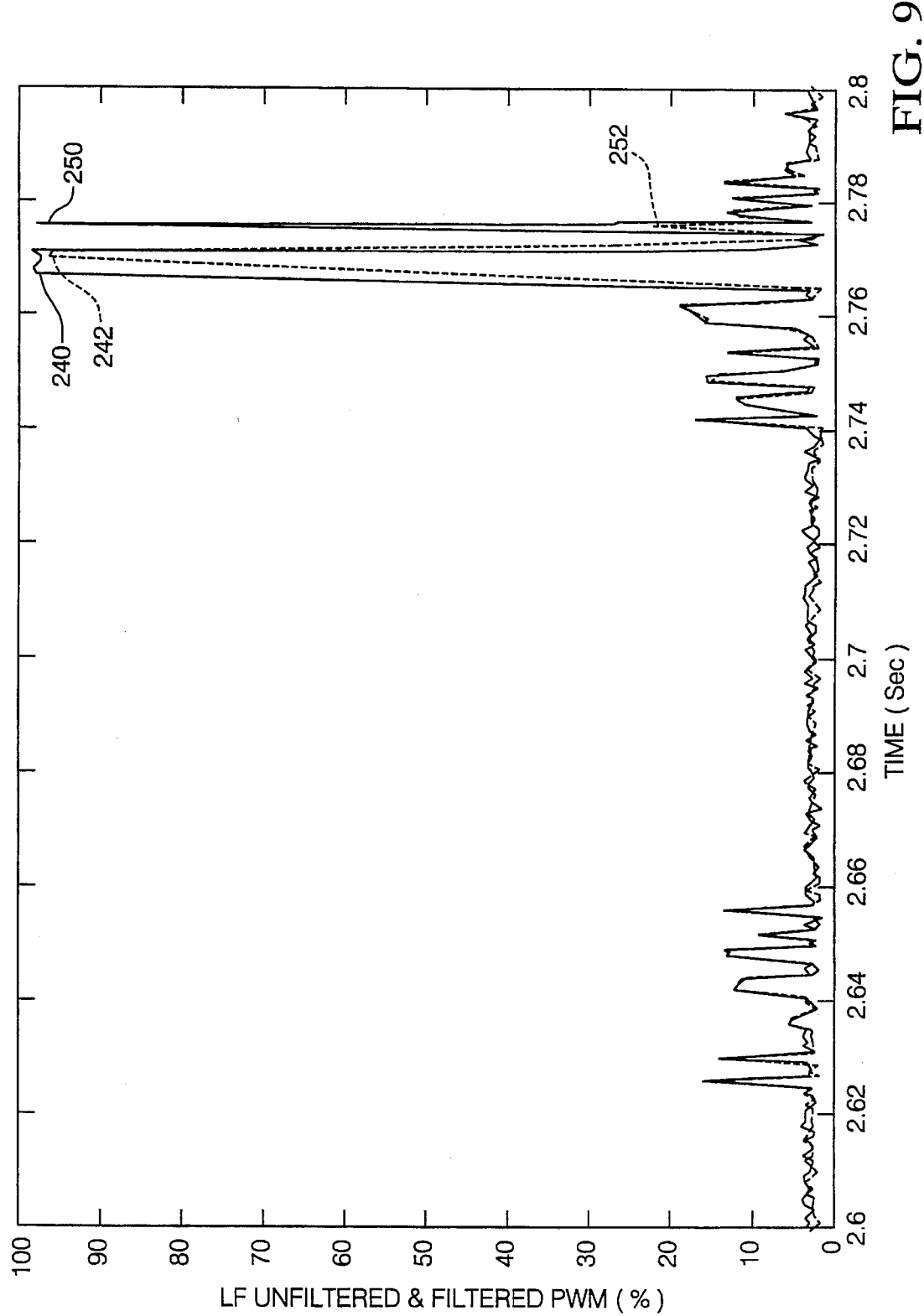

CONTINUOUSLY VARIABLE DAMPING SYSTEM

The subject of this invention is related to the subject of copending U.S. patent applications, Ser. No. 08/410,794, 08/410,795, 08/411,184 and 08/410,788, all filed concurrently with this application, all assigned to the assignee of this invention and all having disclosures that are incorporated herein by reference. This invention is related to the subject of U.S. patent application, Ser. No. 08/358,925, filed Dec. 19, 1994, U.S. Pat. No. 5,510,988 assigned to the assignee of this invention.

This invention relates to a controllable suspension for a motor vehicle.

BACKGROUND OF THE INVENTION

In a typical motor vehicle suspension, a damper is provided that exerts a damping force on relative movement between sprung and unsprung masses of the vehicle. The damping force provided by the damper is related to the relative speed between the sprung and unsprung masses according to a characteristic force-velocity profile. Currently, motor vehicles are available with variable damping systems that allow real-time control of the damper force-velocity profile, allowing switching between two or more profiles. Descriptions of example systems are found in U.S. Pat. Nos. 5,071,157, 5,062,658 and 5,062,657, assigned to the assignee of this invention.

It is known to provide vehicles with variable force dampers controllable between three force curves in an adaptive manner. It is also known to provide a vehicle suspension system with a variable force damper controllable between force curves in an almost continuous manner, in non-real-time.

U.S. Pat. No. 5,282,645, assigned to General Motors Corporation, describes a valve for use with a suspension system having a controllable damper that is capable of providing continuously variable damping control with a fast, real-time, response.

SUMMARY OF THE PRESENT INVENTION

Advantageously, this invention provides a control system for a vehicle having a controllable damper and continuously variable real-time damping control.

Advantageously, this invention provides a control system for a motor vehicle with a continuously variable real time damper that provides fast, continuously variable damping response while also providing improved rideability for the vehicle.

Advantageously this invention provides a control for a vehicle continuously variable real time damper that prevents the undesirable harshness in a continuously variable real time suspension caused by suspension actuator response to high rates of increase in the suspension actuator force commands.

Advantageously this invention provides a control for a vehicle continuously variable real time damper that prevents the generation of audible noise by suspension actuator response to high rates of either increase or decrease in the suspension actuator force commands.

Advantageously, this invention comprises a method of controlling a vehicle suspension system including a real time continuously variable damper comprising the steps of: (a) determining a present actuator command for controlling damping force of the damper; (b) comparing the present actuator command to a previous actuator command to determine a difference value of the actuator commands; (c) if the difference value is positive, limiting the difference value to a positive threshold; (d) if the difference value is negative, limiting the difference value to a negative threshold, wherein the negative threshold has a magnitude greater than a magnitude of the positive threshold; (e) determining an output actuator command responsive to the difference value; and (f) outputting the output actuator command to the damper to control damper force, wherein the limiting of the difference value to the positive threshold reduces suspension harshness and audible noise and wherein the limiting of the difference value to the negative threshold reduces suspension audible noise.

A more detailed description of this invention is set forth below.

BRIEF DESCRIPTION OF THE DRAWINGS

FIG. 9 is a graph illustrating advantages according to this invention.

DETAILED DESCRIPTION OF THE INVENTION

Figure 1:
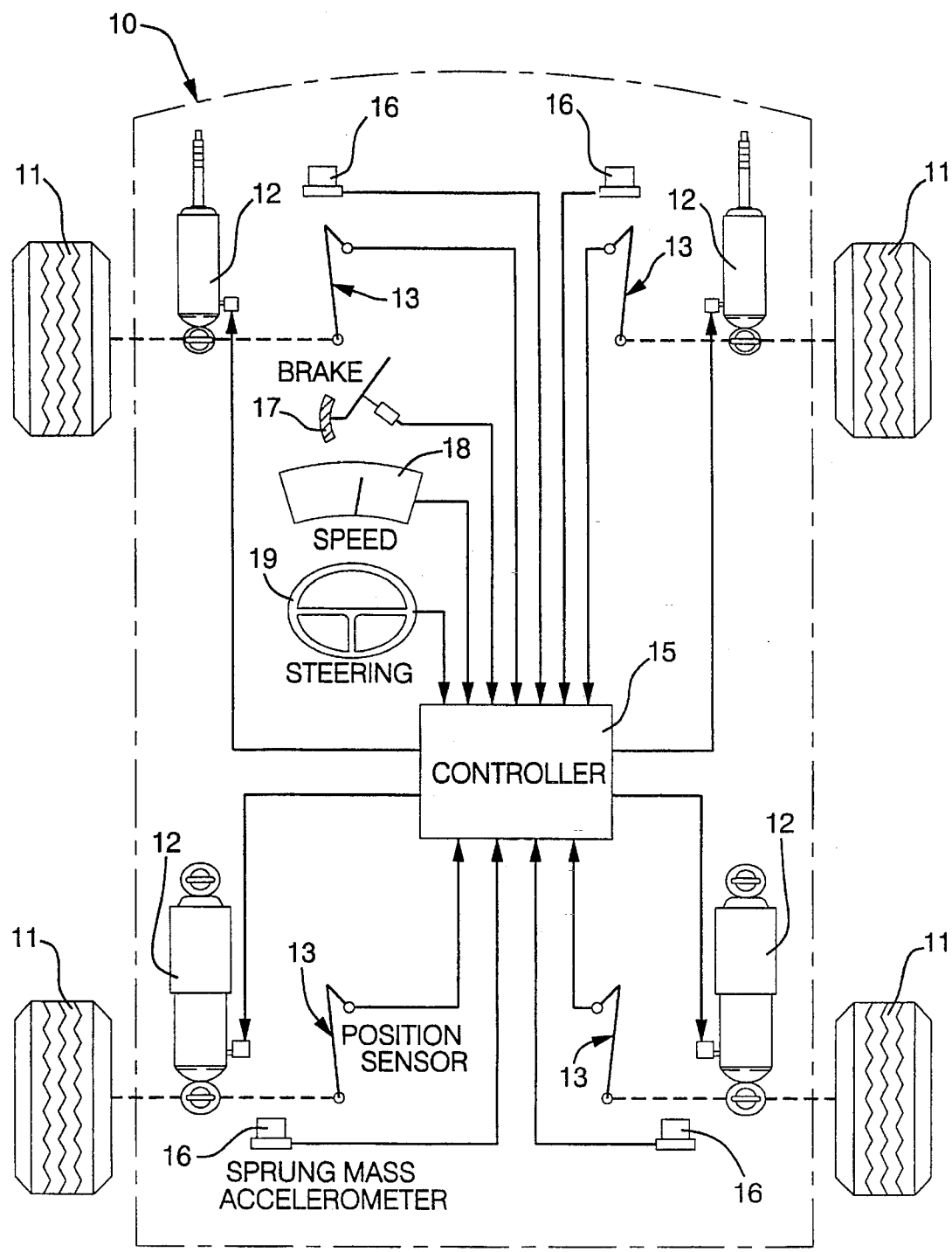
FIG. 1 illustrates a vehicle system in which is implemented the control method of this invention.

FIG. 1 illustrates a schematic diagram of a motor vehicle with suspension control according to this invention. The hardware shown is similar to that shown in U.S. Pat. Nos. 5,062,658 and 5,071,157 and operates in a similar manner with modifications as described below. The descriptions of U.S. Pat. Nos. 5,062,658 and 5,071,157 are incorporated herein by reference.

The vehicle body 10 is supported by four wheels 11 and by four suspensions including springs of a known type (not shown). Each suspension includes a continuously variable real time controllable damper 12 which damper may be in the form of a strut mounted within a coil spring, such as in a McPherson Strut configuration, or it may be in the form of a shock absorber mounted in a conventional shock absorber suspension configuration.

Each corner of the vehicle body 10 includes mounted therein an acceleration sensor 16 (also referred to herein as accelerometer 16) that provides an output indicative of the absolute vertical acceleration of the vehicle body at that corner of the vehicle. The vehicle body absolute velocity at each corner of the vehicle may be determined by integrating the absolute vertical acceleration signal from the respective sensor 16. This integration may be done by controller 15.

Each corner of the vehicle includes a linear position sensor 13 that provides, for that corner of the vehicle, an output signal indicative of the relative distance between the vehicle wheel and the suspended vehicle body at that corner of the vehicle. Each position sensor 13 may include a link coupled to the vehicle wheel and pivotably connected to a pivot arm on a rotary resistive device that provides an impedance output that varies with the relative position between the wheel 11 and the corner of the body 10. Each position sensor 13 may include an internal circuit board with a buffer circuit for buffering the output signal of the rotary resistive device and providing that signal to the controller 15. For ease of packaging, the accelerometer 16 may be mounted to the internal circuit board of position sensor 13 to eliminate the necessity of separately mounting the two sensors 13 and 16. Suitable position sensors 13 can be easily constructed by those skilled in the art. Any alternative type of position sensor, including transformer type sensors, may be used as position sensor 13. The output of the position sensors 13 may be differentiated to produce relative body-wheel vertical velocity signal for each corner of the vehicle.

Control signals used by controller 15 may also be provided by brake pedal 17, by the vehicle speed signal 18 and by a steering wheel angular position sensor for steering wheel 19. Obtaining such signals is easily achieved through the use of known types of sensors available to those skilled in the art.

Responsive to the input control signals, an internal microprocessor of controller 15 runs a control routine that determines the states of the vehicle body 10 and the wheels 11 and determines a continuously variable damping command for each continuously variable damper 12. The damping commands for each damper 12 are output from controller 15 in the form of PWM signals in the manner explained in more detail below.

Figure 2:
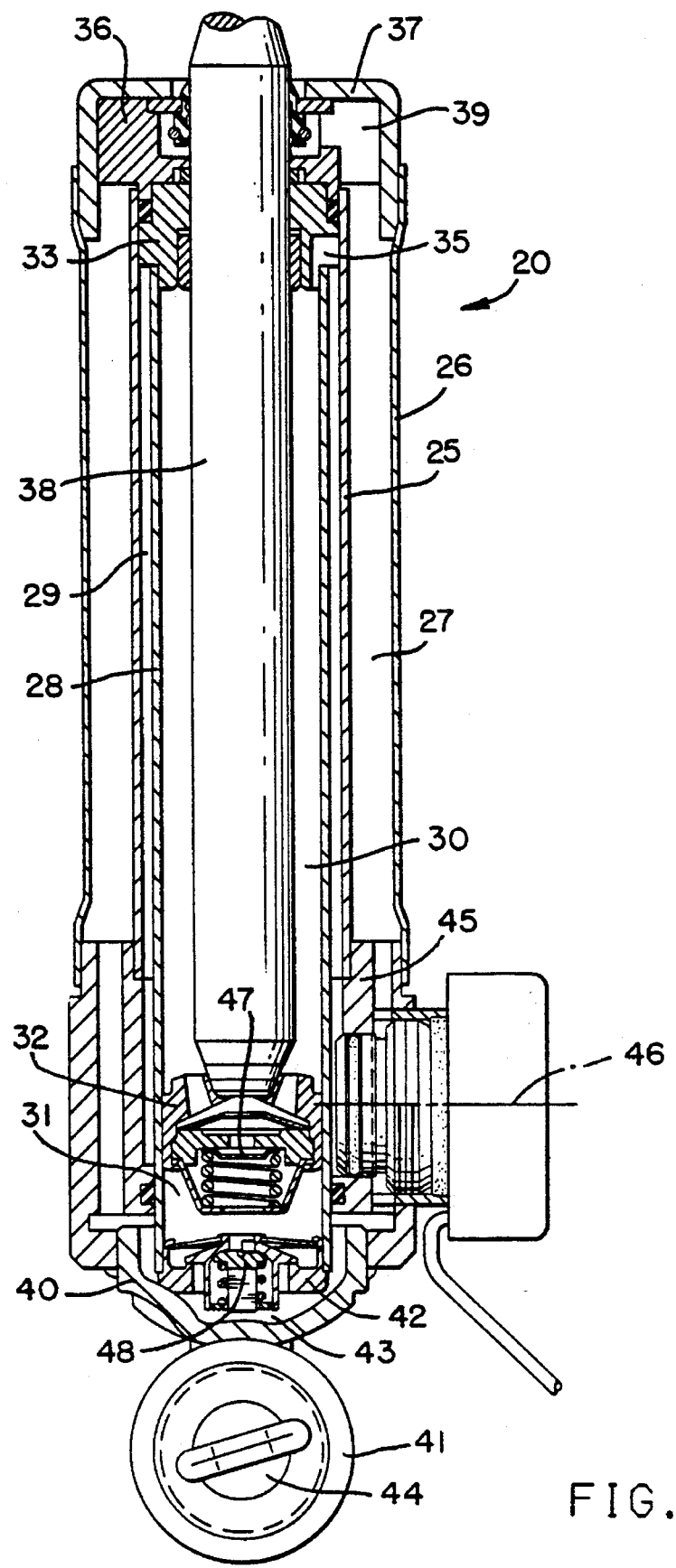
FIG. 2 illustrates a continuously variable real-time responsive variable force damper for use with this invention.

Referring now to FIG. 2, an example continuously variable damper for use with this invention is shown. The above-mentioned U.S. Pat. No. 5,062,658 having a disclosure that is incorporated herein by reference, describes in detail the operation of the damper 20 shown in FIG. 2, with the exceptions of the modifications included in the description below.

In general, the damper 20 contains a sealed unit 26 and a piston 32 connected to piston rod 38. The sealed unit 26 has a lower sealed end 40 connected to a mount 41, which is connected to the vehicle wheel assembly in a known manner, such as to the wheel control arm 44. Piston rod 38 has an upper mount (not shown) connected to the vehicle body in a known manner. With relative movement between the vehicle body and the vehicle wheel, the piston rod and piston move within inner cylinder 28 relative to the cylinder unit 26. The cylinder unit 26 is filled with hydraulic damping fluid in passages 30 and 31. Passage 30 communicates to passage 29, which is an annular passage between cylinders 28 and 25. The communication path is shown as reference 35 through rod guide and seal 33. Valve 46 is a continuously variable electro-hydraulic pressure regulating valve assembly, preferably of the type shown in U.S. Pat. No. 5,282,645, issued Feb. 1, 1994, and assigned to the assignee of this invention. The disclosure of U.S. Pat. No. 5,282,645 is incorporated herein by reference.

Valve 46 controls the communication of fluid between passage 29 and outer annular passage 27 defining a reservoir formed between cylinder wall 25 and the outer wall of the unit 26. Piston 32 contains valve end 47 of a known type. Closure cap 42 for lower chamber 31 contains a standard base valve. The piston and base valve provide compression and rebound damping forces characteristic of the known manner of prior art shocks and struts for motor vehicles. The bypass valve 46 can be closed to prevent direct communication between annular passage 29 and reservoir 27 producing a high damping force curve of the damper or can be open in a controlled response to a pulse width modulated signal. The pulse width modulated signal has a duty cycle range of 0–100 percent to provide a continuously variable range of decrease in the flow restriction between passage 29 and reservoir 27, between a maximum restricted flow when the valve is closed in response to a 0 percent duty cycle command and a minimum restricted flow when the valve is open in response to a 100 percent duty cycle command, or vice versa.

Typically, an extension or rebound upward movement of piston 32 causes throttle flow through the orifices and at high velocity through the blow-off valve of piston 32. This flow is equal to the decrease in the annular volume of upper chamber 30 and a flow equal to the displaced rod 38 volume is drawn into lower chamber 31 from reservoir 27 in a relatively unrestricted manner through the check valve of base valve apparatus 48. Likewise, in compression, downward movement of piston 32 drives fluid out of lower chamber 31 in a relatively unrestricted manner through a check valve of piston valve and orifice apparatus 47. This flow is equal to the increase in the annular volume of upper chamber 30, but the volume of lower chamber 30 is further decreasing by the displaced rod 38 volume. Therefore, a throttled flow equal to the displaced rod volume is driven out of the lower chamber 30 through the orifices and at high velocity the blow-off valve of base valve apparatus 48. With by-pass valve apparatus 46 commanded full open to allow direct communication between annular passage 29 and reservoir 27, however, the apparatus will produce its minimum damping force curve.

In extension, the displaced fluids from upper chamber 30 is a comparatively unrestricted flow path through the open valve of apparatus 46 to reservoir 27. In the full increase of lower chamber 30, flow is relatively unrestricted from reservoir 27 through the check valve of base valve assembly 48 into lower chamber 30. In compression, a fluid flow equal to the full decrease of the volume of lower chamber 31 finds relatively unrestricted passage through the check valve of piston valve and orifice assembly 47 and a flow equal to the displaced rod 38 volume finds relatively unrestricted passage from upper chamber 30 to the open valve of apparatus 46 to reservoir 27.

As the controller 15 varies the command to valve apparatus 46, the restriction in the flow between reservoir 27 and passage 29 increases over continuous range to provide a continuous range of damping forces from the minimum damping force to the maximum damping force capable by the damper when the valve 46 is closed.

Figure 3:
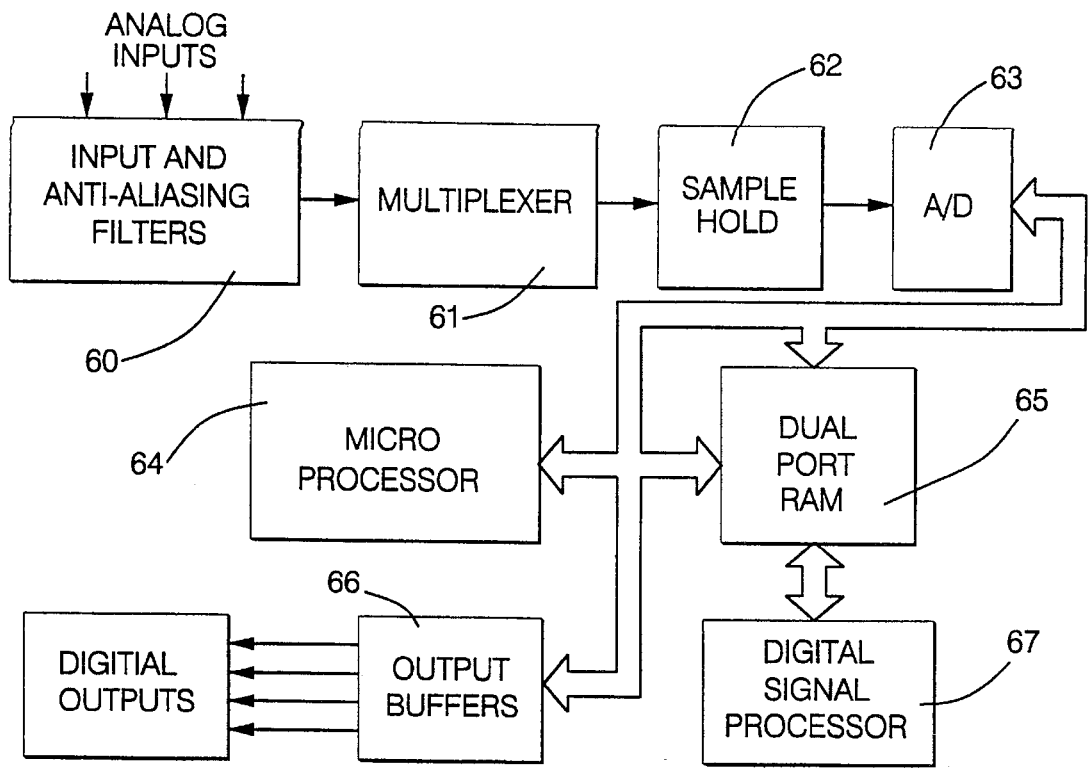
FIG. 3 illustrates schematically a control unit for carrying out the control method of this invention in accordance with the apparatus shown in FIG. 1.

Referring now to FIG. 3, a schematic illustration of the controller 15 for use with this invention is shown.

The controller includes an analog input and anti-aliasing filter circuit 60 for receiving the analog input from the sensors described above with reference to FIG. 1. If desired, the input and anti-aliasing filters may be mounted within the circuitry used with the sensors and separate from the controller. Filtration of the input signals should be done in the manner to limit signal changes of important signals to a rate to which microprocessor 64 can respond. The signals from the input and anti-aliasing filter 60 are then provided to multiplexer 61, which provides each signal, in turn, to a sample and hold circuit 62 and through an analog to digital (A/D) converter 63 for use by microprocessor 64. An 8-bit bi-directional data bus couples A/D converter 63, microprocessor 64, dual port RAM 65 and output buffer 66. The input signals are stored temporarily in the dual port RAM 65 and the microprocessor 64 makes use of the signals in determining the control command for the controllable valve of each damper.

A digital signal processor or math co-processor 67 is provided to allow faster execution of the control routine by microprocessor 64 by performing the complicated mathematical computations. Once the control commands are determined by microprocessor 64, they are provided to the output buffers 66 which interface in the digital processing apparatus with the actuators 46.

A more complete description of the controller may be found in the paper, Dual Processor Automotive Controller, by Kamal N. Majeed, published in the proceedings of I.E.E.E./Applications of Automotive Electronics, Dearborn, Mich., Oct. 19, 1988.

An example microprocessor suitable for use with this invention is Motorola 68HC11 KA4, which is adapted for providing PWM output control commands. The interface between the microprocessor 64 and the variable force dampers may be as follows. Each valve 46 in the variable force dampers 13 includes a solenoid that, responsive to the PWM command for that damper, controls the flow restriction of valve 46. A p-channel FET may be used as the switch for the high side of the valve solenoid and the low side of the solenoid may be directly coupled to ground. The p-channel FET may be driven by an n-channel FET that is directly driven by the output of the microprocessor. EMI filtering, in a known manner, may be implemented if desired.

Those skilled in the art will understand that any suitable microcomputer-based controller capable of processing the analog input signals, performing the required control routine and providing the requisite output signal, can be used in place of the controller shown in FIG. 3.

The basic control architecture of the control used by controller 15 may be that described in the above-mentioned U.S. Pat. No. 5,062,658, incorporated herein by reference. Because this control architecture is not central to understanding this invention, it will not be reproduced below in detail, except as follows. If further details are desired, reference may be had to the above-mentioned U.S. Pat. No. 5,062,658.

Figure 4:
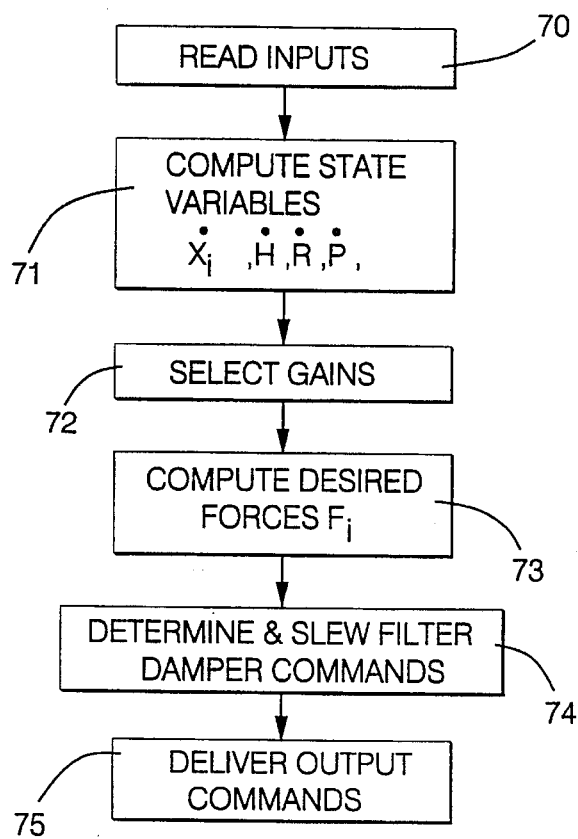
FIG. 4 illustrates a flow routine for controlling, according to this invention, a variable force damper.

Referring now to FIG. 4, the main control routine for implementing control of the variable force suspension starts at block 70 where it reads the inputs from the various sensors described with reference to FIG. 1. At block 71, the various state variables for the vehicle body and wheels are computed. The variables may include heave, roll and pitch positions and velocities of the body and position and velocity of each wheel.

The control implemented may be in the general form of a computation of desired damping force $F_i$, according to the equation:

$$F_i = G_{wi} X_i(\text{dot}) + G_{hi} H(\text{dot}) + G_{ri} R(\text{dot}) + G_{pi} P(\text{dot})$$

where the suffix "dot" represents a derivative of a variable and is generally denoted in the prior art with a dot over the variable name, the values $G_{wi}$, $G_{hi}$, $G_{ri}$ and $G_{pi}$ are the various gains, where $x_i$ is wheel position, $x_i(\text{dot})$ is wheel velocity, $H(\text{dot})$ is body heave velocity, $R(\text{dot})$ is body roll velocity and $P(\text{dot})$ is body pitch velocity.

It may be desirable in implementing the above control to select the gains $G_{wi}$, $G_{hi}$, $G_{ri}$ and $G_{pi}$ from various sets of gains in response to the state of the vehicle wheels and/or body. The computation of the state variables at block 71 and the selection of the gains at block 72 is described in detail in U.S. Pat. No. 5,062,658 and will not be set forth in further detail herein.

Alternatively, the control implemented may be in the general form set forth in copending application, Ser. No. 08/410,788, in which the body and wheel portions of the desired damping force determination are determined separately and combined to determine the desired damping force determination in a phase-based manner. More particularly, the wheel component of the desired force may be determined by a passive nonlinear function responsive to suspension relative velocity, f(RV), and may be scaled responsive to the average vertical wheel velocity and/or vehicle lateral acceleration. The body component of the desired damping force is determined as described above and combined with the wheel component based on a the phase relationship of the body and wheel components. If the body and wheel desired force components are out of phase, then the body and wheel force components are added. If the body and wheel desired force components are in phase, then the body component is selected as the desired force command, unless the wheel component is greater than the body component, in which case the wheel component is selected as the desired force command. This example control implementation is the subject of the above-mentioned copending applications Ser. Nos. 08/410,794, 08/410,795, 08/411,184 and 08/410,788, the disclosures of which are incorporated herein by reference. Because the specific control architecture for determining the desired damping force is not central to this invention, it will not be reprinted in greater detail herein.

The routine then moves to block 73 where it computes, according to the above equation, the desired damping force for each damper responsive to the analog inputs and the selected gains. Steps 72 and 73 are performed for each corner of the vehicle to compute four force commands, $F_i$, one for each damper. Block 74 determines the damper commands according to this invention and block 75 delivers the output commands to the actuators.

Figure 5:
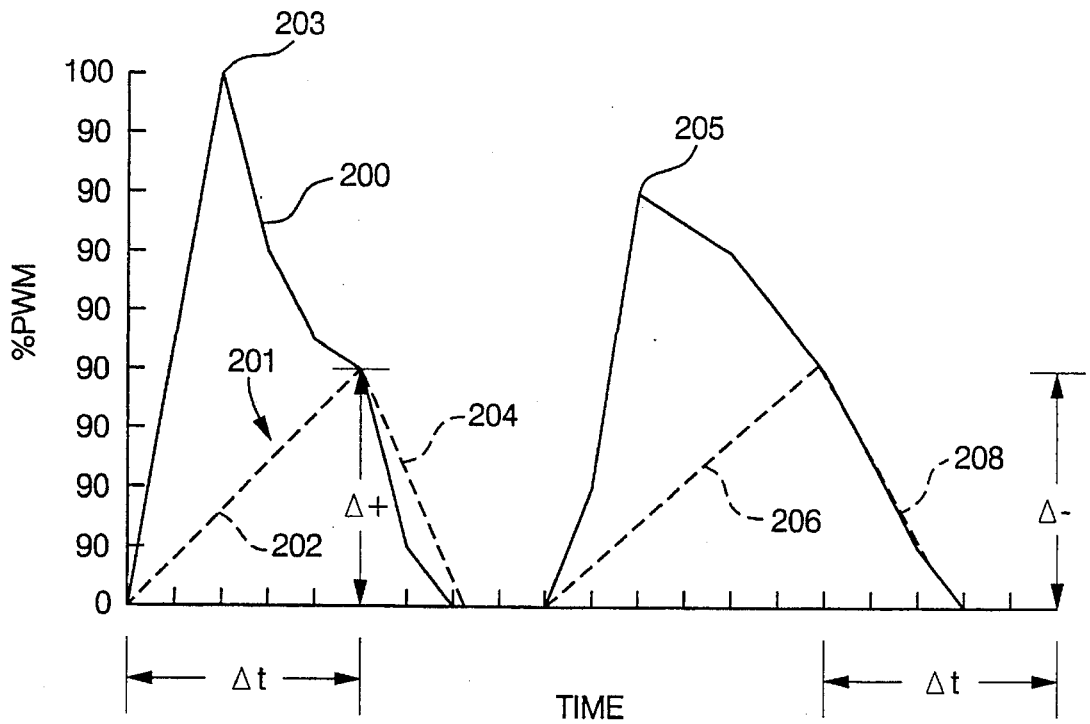
FIG. 5 illustrates the control method of this invention.

The graph in FIG. 5 shows an example plot of computed force 200 versus time. As shown in the Figure, it is not unusual for the computer demanded force to spike-up from minimum to a maximum damping force request at a fast rate, as occurs for the spikes with peaks 203 and 205. It has been found according to this invention that control of a continuously variable damper directly responsive to the demanded force during such spike conditions can result in a suspension harshness, which may be perceived by the vehicle operator as increased suspension noise, road noise, and unnecessary suspension harshness and can result in increased electromagnetic interference (EMI) noise.

According to this invention, the command to each continuously-variable variable force damper is limited to prevent this harshness by a dynamic rate-limiting filter (also referred to herein as slew filter) that controls the ramp-up rate of the damper commands, limiting the ramp-up rate for each command to a predetermined rate limit. This invention further controls the command to each continuously-variable variable force damper, allowing ramp-down of the suspension command at a different ramp-down rate than the ramp up rate limit, which different ramp-down rate is typically higher than the ramp up rate. The imposition of these ramp-up and ramp-down rates on the damper command forces the damper command to follow a path 201, which is limited to the predetermined ramp-up rate and the predetermined ramp-down rate when the requested ramp-up and/or ramp-down rates are greater than the predetermined rate limits. Since the undesirable harshness is caused by the quick peaking of the force command 200, when the force command 200 is forced instead to follow the path 201, the quick peaking to points 203 and 205 is eliminated and the rate of change of the increasing portions of the force command 202 and 206 is such that the undesirable harshness is eliminated. Since quick declining in the force command does not cause the undesirable harshness, a rapid rate of decrease of the force command 200, for example references 204 and 208, can be maintained without detracting from the operation or operator feel of the suspension. While the ramp-down rate is greater than the ramp-up rate, the ramp-down rate is maintained below a predetermined limit to prevent the generation of audible noise caused by a rapid decrease in damper load.

Thus, continuously variable damping control of the suspension may be maintained without bidding to ride harshness caused by spikes in the damper force command. Additionally, the suspension audible noise level is decreased and the elimination of spikes in the force command reduces the number of rapid changes of the output signals of the controller to the damper, reducing the level of radiated electromagnetic interference caused by the suspension control system. Further, the ramp-up and ramp-down rate limits imposed by this invention decrease high frequency cycling of the damper valve 46, thereby increasing the life of the damper.

Figure 6:
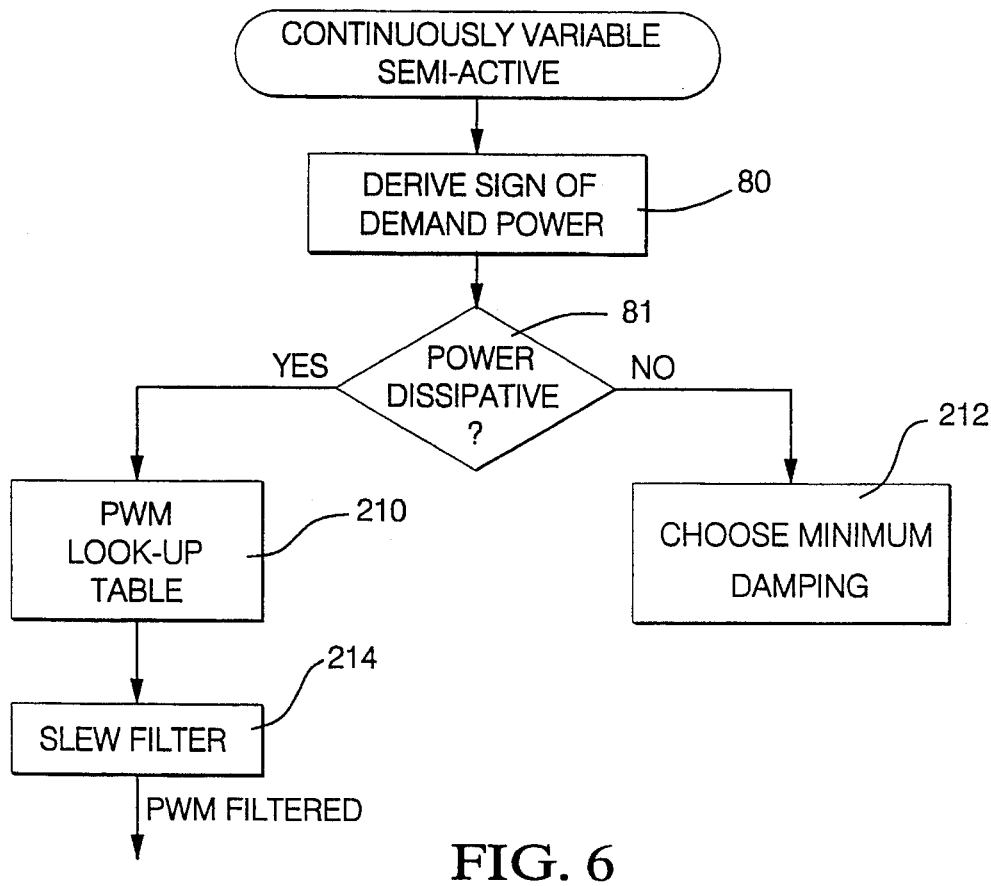
FIG. 6 illustrates a control routine for use with this invention.

Referring now to FIG. 6, the determination of the damper command according to this invention starts at block 80 where the sign of the demand power is determined. If the desired force and the body-wheel relative velocity for the corner of the vehicle being controlled are the same, then the power demand is dissipative and may be supplied by the damper. Thus, at block 81, if the signs of the commanded force and the relative velocity are not the same, the routine moves to block 212 where it sets the value PWM, the unfiltered duty cycle command, to its minimum value, for example 0 corresponding to a 0 percent duty cycle PWM command. If the power is dissipative, the routine moves to block 210 where it looks up the value PWM from a look-up table based on the computed force $F_i$ and the relative velocity between the body and wheel of that corner of the vehicle.

Figure 7:
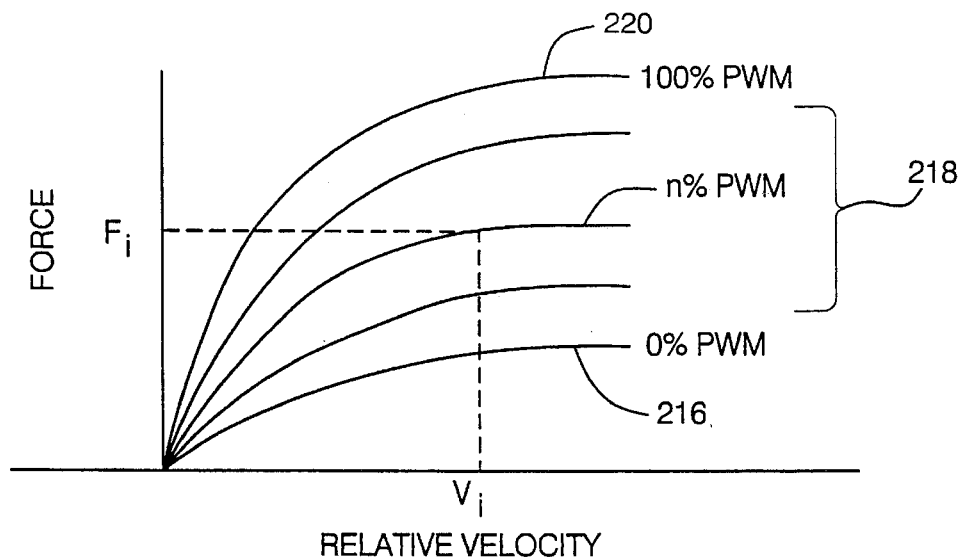
FIG. 7 illustrates a graph for determining a PWM command according to this invention.

FIG. 7 illustrates how the look-up table works. Several damping responses corresponding to percent duty cycle PWM commands are plotted according to their force versus relative velocity profiles. The minimum damping force profile corresponding, in this example, to a 0 percent duty cycle PWM signal, where valve 46 is fully open, is shown as trace 216. Trace 220 represents the maximum damping force profile, for example, corresponding to a 100 percent duty cycle PWM signal. The traces 218 between traces 216 and 220 represent force versus velocity profiles of n percent duty cycle PWM signals applied to the damper valve, where, for example, n ranges from 1 to 99.

The force command $F_i$ and the relative velocity v are input into the look-up table, which provides an output signal representing the duty cycle corresponding to the curve that the point corresponding to the two input values falls on. If the point corresponding to the two input values falls between two of the curves, either the closest curve may be used as the output, the curves can be treated as range boundaries, or the output value can be an interpolation between the two curves. The resultant output from the look-up table is the value for the command PWM representing a percentage that the PWM signal is on.

Another example implementation of the PWM look-up table is set forth in copending application, Ser. No. 08/410,788, incorporated herein by reference.

At block 214 the PWM signal is filtered by a dynamic rate-limiting filter to limit the rate of change of the PWM signal in the manner described above with reference to FIG. 5.

Figure 8:
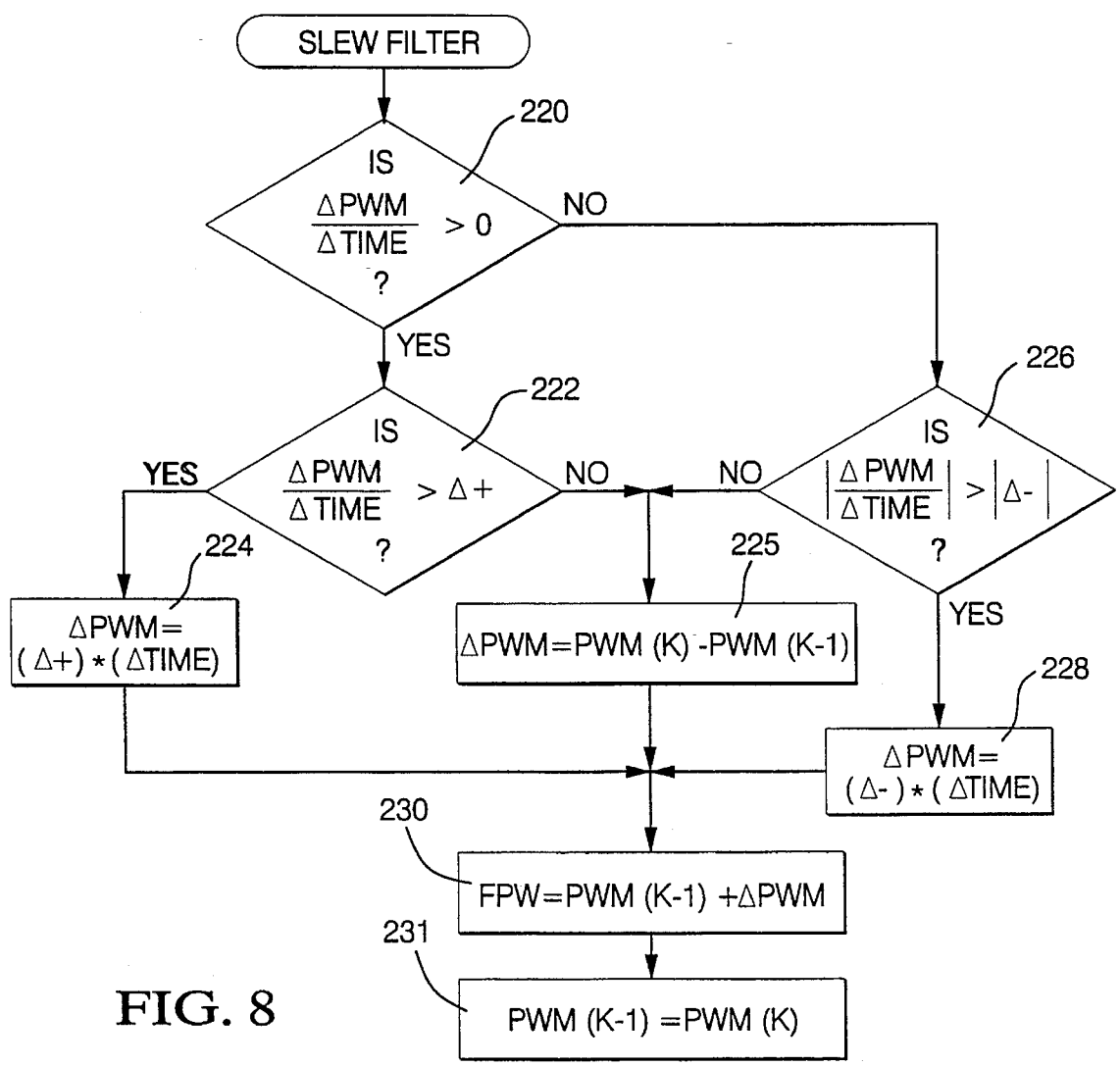
FIG. 8 illustrates a control routine for use with this invention.

Referring now to FIG. 8, a routine for performing the dynamic rate-limiting filtration 214, shown in FIG. 6, starts at block 220. At block 220 the routine compares the ratio DeltaPWM/Deltatime to 0. This ratio may be determined by subtracting from the PWM signal at the present time, k, the PWM signal at the time k-1, which was the PWM signal determined at the last loop through the control program. The comparison may be represented by:

$PWM(k)-PWM(k-1)>0$?

If the above test is true, that is, if PWM(k)-PWM(k-1) is greater than zero, the routine moves to block 222 where the ratio, DeltaPWM/Deltatime is compared to the value of Delta+, which is the ramp-up rate limit of the damper force command. This comparison may be achieved by defining a value UPLIMIT as:

UPLIMIT=(Delta+)*(Deltatime), where Deltatime is the time period between consecutive loops of the control program and where UPLIMIT is the predetermined maximum ramp-up allowable change of the force command to be provided to the variable force dampers. The comparison may then be represented by:

$PWM(k)-PWM(k-1)>UPLIMIT$?

If at block 222, the above test is true, then the routine moves to block 224, where it limits DeltaPWM/Deltatime to Delta+, for example by:

Delta$PWM$=UPLIMIT, where DeltaPWM is also referred to herein as the change value indicating the change in the PWM command for the present loop of the control routine. If, at block 222, the test was not true, the routine moves to block 225 where DeltaPWM is determined by:

Delta$PWM$=$PWM(k)$-$PWM(k-1)$.

If at block 220, the test is not true, then the routine moves to block 226 where Delta PWM/Deltatime is compared to a value Delta-, which is the ramp-down rate limit of the PWM signal and is set at a rate significantly greater than the ramp-up rate limit Delta+. For example, the test at block 226 may be achieved by first defining:

DOWNLIMIT=(Delta-)*(Deltatime), where DOWNLIMIT is the ramp-down allowable change limit for the PWM command. The comparison may then be represented as:

|$PWM(k)-PWM(k-1)$|>|DOWNLIMIT|?

If the above test is true, the routine continues to block 228 where DeltaPWM/Deltatime is limited to the value Delta-, according to:

Delta$PWM$=DOWNLIMIT.

If the test at block 226 is not true, then the routine moves to block 225, described above.

The routine then continues to block 230, as shown, where the resultant filtered PWM command, FPWM, according to this invention, is determined by:

$$FPWM(k)=PWM(k-1)+\text{Delta}PWM.$$

Block 231 prepares for the next loop of the control routine by setting PWM(k–1) equal to PWM(k). A command FPWM(k) for each corner of the vehicle is then provided at block 75 (FIG. 4) to each actuator to control the damping force of each actuator.

The above command computation and rate limiting according to this invention is executed for each corner of the vehicle so that the damper for each wheel of the vehicle receives a damping command responsive, in real time, to the vehicle body conditions and the state of the vehicle wheel.

The dynamic rate-limiting filter according to this invention has separate up and down limits on the rate of change of the PWM signals used to control the variable force actuators to limit noise created by sudden changes in damper force, limit high frequency cycling of the damper valves and attenuate high frequency components of the damper valve command.

As described in copending application Ser. No. 08/410, 788, more than one set of rate of change limits according to this invention may be used and different sets of rate of change limits may be selected responsive to body or wheel states. For example, the selection of the set of rate of change limits may be made using the gain table pointers described in copending application Ser. No. 08/410,788, which portions are responsive to body heave, pitch and roll velocities and body lateral acceleration. In this example, if there is no significant body heave, pitch or roll velocity and if there is no significant vehicle lateral acceleration, then a first set of rate of change limits is selected from controller memory. If there is a significant body heave, pitch or roll velocity or a significant vehicle lateral acceleration, then a second set of rate of change limits is selected from memory. In another example system, the rate of change limits may be selected from three or more sets of rate of change limits stored in memory. In general, the stored sets of rate of change limits are calibrated to allow a smaller change rate in the damper command when less body control is necessary and a larger change rate when greater body control is necessary.

Referring now to FIG. 9, the graphs shown illustrate a part of the unfiltered force command (PWM) versus the force command (FPWM) filtered according to this invention. Benefits according to this invention can be seen, for example, at peaks 240 and 250 of the unfiltered command signal. Reference 242 illustrates that the filtered signal increased at a much slower rate than the unfiltered signal PWM, eliminating several high frequency components from the control output. The eliminated high frequency components would have contributed to ride harshness, suspension noise and radiated EMI. More dramatically, peak 250, occurring in the unfiltered signal PWM, is virtually eliminated altogether from the filtered signal FPWM, according to this invention, which reaches only the point designated by reference 252, thus eliminating the spike in damping force in the controllable damper.

In the graph shown, ramp-up rate was limited to 20 percent of the span of the PWM signal per loop (example loop time is 1 ms) of the control program while ramp-down rate was limited to 40 percent of the span of the PWM signal per loop of the control program. The illustrated result provides improvements in the form of reductions in vehicle ride harshness and suspension noise, reductions in radiated electromagnetic interference, and reductions in the number of high-frequency cycles of the damper actuator valves.

The above-described implementations of this invention are example implementations. The example described above with reference to FIG. 1 illustrates accelerometers 16 on the four corners of the vehicle body. In another example implementation of this invention, the accelerometers 16 are eliminated according to the invention described in application, Ser. No. 08/358,925, U.S. Pat. No. 5,510,988 mentioned above and incorporated herein by reference.

Further it will be understood that the control routine described above with reference to U.S. Pat. No. 5,062,658 is an example routine for determining an actuator command. Those skilled in the art will appreciate that this invention contemplates the substitution of any control routine for computing a variable force actuator command for that described above and the use of such control routine together with the rate-limiting according to this invention.

Moreover, various other improvements and modifications to this invention may occur to those skilled in the an and such improvements and modifications will fall into the scope of this invention as set forth below.

The embodiments of the invention in which an exclusive property or privilege is claimed are defined as follows:

1. A method of controlling a vehicle suspension system including a real time continuously variable damper comprising the steps of:
   (a) receiving input data of a set of vehicle parameters;
   (b) determining a desired damping force for the continuously variable damper responsive to the input data;
   (c) determining a present actuator command responsive to the determined desired damping force;
   (d) comparing the present actuator command to a previous actuator command to determine a rate of change value of the actuator commands;
   (e) if the rate of change value is positive, comparing that rate of change value to a positive Delta threshold;
   (f) if the rate of change value is positive and is greater than the positive Delta threshold, limiting the rate of change value equal to the positive Delta threshold;
   (g) if the rate of change value is negative, comparing the rate of change value to a negative Delta threshold;
   (h) if the rate of change value is negative and if a first magnitude of the rate of change value is greater than a second magnitude of the negative Delta threshold, limiting the rate of change value to the negative Delta threshold, wherein the second magnitude of the negative Delta threshold is different from a third magnitude of the positive Delta threshold;
   (i) determining an output actuator command responsive to said rate of change value; and
   (j) outputting the output actuator command to the damper to control damper force.

2. A motor vehicle suspension system comprising:
   a set of real time continuously variable dampers, each damper having a damping force controllable responsive to a damper command;
   a microprocessor-based controller comprising: (a) means for receiving input data of a set of vehicle parameters, (b) means responsive to the input data for determining a set of desired damping forces, one desired damping force corresponding to each vehicle damper, (c) means for determining a set of present actuator commands responsive to the determined desired damping forces, one present actuator command corresponding to each desired damping force;

means for limiting each actuator command of the set of actuator commands, including (a) means for comparing each present actuator command to a previous corresponding actuator command to determine a rate of change value of each actuator command, (b) means for comparing each rate of change value that is positive to a positive Delta threshold, (c) means for limiting each one of the rate of change values that is greater than the positive Delta threshold to the positive Delta threshold, (d) means for comparing each rate of change value that is negative to a negative Delta threshold, (e) means for limiting each one of the rate of change values that is negative and that has a magnitude greater than a magnitude of the negative Delta threshold to the negative Delta threshold, and (f) means for determining a set of damper commands responsive to the rate of change values; and means for outputting the damper commands to the dampers to control damper force.

3. A method of controlling a vehicle suspension system including a real time continuously variable damper comprising the steps of:

(a) determining a present actuator command for controlling damping force of the damper;

(b) comparing the present actuator command to a previous actuator command to determine a difference value of the actuator commands;

(c) if the difference value is positive, limiting the difference value to a positive threshold;

(d) if the difference value is negative, limiting the difference value to a negative threshold, wherein the negative threshold has a magnitude greater than a magnitude of the positive threshold;

(e) determining an output actuator command responsive to the difference value; and (f) outputting the output actuator command to the damper to control damper force, wherein the limiting of the difference value to the positive threshold reduces suspension harshness and audible noise and wherein the limiting of the difference value to the negative threshold reduces suspension audible noise.

4. A method of controlling a vehicle suspension system including a real time continuously variable damper comprising the steps of:

(a) determining a present actuator command for controlling damping force of the damper;

(b) comparing the present actuator command to a previous actuator command to determine a difference value of the actuator commands;

(c) if the difference value is positive and greater than a positive threshold, setting a change value equal to the positive threshold;

(d) if the difference value is negative and has a magnitude greater than a magnitude of a negative threshold, setting the change value equal to the negative threshold;

(e) if the difference value is less than the positive threshold and greater than the negative threshold, setting the change value equal to the difference value;

(e) determining an output actuator command responsive to the change value; and (f) outputting the output actuator command to the damper to control damper force, wherein suspension harshness and audible noise are reduced.

* * * * *